(12) United States Patent
Secretin et al.

(10) Patent No.: US 11,758,635 B2
(45) Date of Patent: Sep. 12, 2023

(54) LUMINAIRE NETWORK WITH SENSORS

(71) Applicant: Schreder S.A., Brussels (BE)

(72) Inventors: Laurent Secretin, Rémicourt (BE); Junaid Aslam, Leuven (BE)

(73) Assignee: Schreder S.A., Brussels (BE)

( * ) Notice: Subject to any disclaimer, the term of this patent is extended or adjusted under 35 U.S.C. 154(b) by 105 days.

(21) Appl. No.: 15/733,611

(22) PCT Filed: Mar. 18, 2019

(86) PCT No.: PCT/EP2019/056713
§ 371 (c)(1),
(2) Date: Sep. 15, 2020

(87) PCT Pub. No.: WO2019/175435
PCT Pub. Date: Sep. 19, 2019

(65) Prior Publication Data
US 2021/0045218 A1  Feb. 11, 2021

(30) Foreign Application Priority Data

Mar. 16, 2018  (BE) .................................... 20185172
Mar. 16, 2018  (BE) .................................... 20185174

(51) Int. Cl.
*H05B 47/12* (2020.01)
*H05B 47/125* (2020.01)
(Continued)

(52) U.S. Cl.
CPC ......... *H05B 47/125* (2020.01); *G08G 1/0108* (2013.01); *G08G 1/04* (2013.01);
(Continued)

(58) Field of Classification Search
CPC .... H05B 47/125; H05B 47/12; H05B 47/175; H05B 47/195; G08G 1/0108; G08G 1/04;
(Continued)

(56) References Cited

U.S. PATENT DOCUMENTS

2009/0002148 A1   1/2009  Horvitz
2009/0315485 A1*  12/2009  Verfuerth ............... H05B 41/38
                                                           315/320
(Continued)

FOREIGN PATENT DOCUMENTS

CN   101571997 A     11/2009
EP     2874132 A2     5/2015
GB     2518784 A  *   4/2015  ............. G08G 1/065

OTHER PUBLICATIONS

PCT International Search Report and Written Opinion, PCT International Application No. PCT/EP2019/056713, dated Oct. 18, 2019.

*Primary Examiner* — Tung X Le
(74) *Attorney, Agent, or Firm* — McDonnell Boehnen Hulbert & Berghoff LLP

(57) ABSTRACT

The invention relates to a luminaire network, comprising a plurality of luminaires comprising a lighting apparatus, wherein a plurality of the luminaires comprise a communication unit configured to enable communication of data between said plurality of luminaires and/or with a central unit; a processing unit; a control unit configured to control the lighting apparatus as well as the communication and processing units and at least one first sensor configured to output first sensed data. The processing unit of the luminaire is configured to process the first sensed data to produce first processed data, and the luminaire network is further configured such that the first processed data of at least two luminaires is further processed to produce second processed data. The invention further relates to a method of processing sensor data in a luminaire network.

20 Claims, 4 Drawing Sheets

(51) Int. Cl.
*G08G 1/01* (2006.01)
*G08G 1/04* (2006.01)
*G08G 1/042* (2006.01)
*G08G 1/052* (2006.01)
*G08G 1/056* (2006.01)

(52) U.S. Cl.
CPC ............. *G08G 1/042* (2013.01); *G08G 1/052* (2013.01); *G08G 1/056* (2013.01); *H05B 47/12* (2020.01)

(58) Field of Classification Search
CPC ........ G08G 1/042; G08G 1/052; G08G 1/056; G08G 1/075; G08G 1/096758; G08G 1/096783; G08G 5/0026; G08G 5/0082; G08G 1/0116; G08G 1/0133; G08G 1/0141; G08G 1/015; G08G 1/02; G08G 1/096716; G08G 1/096775; G08G 1/20; G08G 5/0069; Y02B 20/40; G01S 13/91; G06K 9/00785

See application file for complete search history.

(56) References Cited

U.S. PATENT DOCUMENTS

| | | | |
|---|---|---|---|
| 2010/0201267 A1* | 8/2010 | Bourquin | H05B 47/175 315/32 |
| 2011/0199004 A1* | 8/2011 | Henig | H05B 47/105 315/152 |
| 2011/0211110 A1* | 9/2011 | Doublet | H05B 47/125 348/370 |
| 2012/0038490 A1* | 2/2012 | Verfuerth | G08G 1/0133 340/910 |
| 2012/0143357 A1* | 6/2012 | Chemel | G01D 18/00 702/128 |
| 2016/0171312 A1 | 6/2016 | Aoki et al. | |
| 2017/0301220 A1* | 10/2017 | Jarrell | F21S 2/005 |

* cited by examiner

LUMINAIRE NETWORK WITH SENSORS

CROSS-REFERENCE TO RELATED APPLICATION

The present application is a national stage entry of PCT/EP2019/056713 filed on Mar. 18, 2019, which claims priority to BE 20185172, filed on Mar. 16, 2018, and BE 20185174, filed on Mar. 16, 2018, the contents of each of which are hereby incorporated by reference.

FIELD OF THE INVENTION

The field of the invention relates to networks of luminaires, in particular outdoor luminaires, comprising communication units, processing units and sensors.

BACKGROUND

Luminaires, in particular outdoor luminaires, are increasingly getting "smarter", in the sense that they may be outfitted with control units which allow for sophisticated control of the lights in the luminaires, and in that they now may comprise communication units which allow a network of luminaires to be controlled from a central point, and which may even allow the luminaires to communicate with one another.

Some luminaires furthermore may comprise sensors to sense data about the environment. Sometimes this information is used to influence the behavior of the luminaire: for instance, a sensor may measure the ambient light and adjust the light intensity accordingly. However, the sensed data is not limited to this purpose: the luminaire post or head may be a convenient location to attach, for instance, a camera to survey the environment.

Processing of more complex sensed data is an issue in those systems. In what follows, we will use the processing of images taken by a camera as an example, but similar issues apply for other sensors and types of sensed data. Generally, two methods are used.

In the first method, processing is performed centrally. This is often referred to as server-based processing. Images are captured locally and transmitted to a server, which may have quite high processing capabilities. An advantage is that due to the processing power of the server, the requirements placed on the sensed images are reduced: even with low resolution, bad lighting conditions and/or a camera lens of poor quality, a desired accuracy may be achieved. This means that when server-based processing is used, the cameras included in the luminaires may be fairly cheap. A drawback, however, is that all the data need to be transported to the server. This may lead to very high data transmission requirements, especially for applications that require frequent updating of sensed data. Therefore, while the hardware costs may be low enough that each luminaire could in principle be equipped with a sensor, the cost of data transmission will in many cases be prohibitively high.

In the second method, processing is performed locally, using a processing unit included in the luminaire itself, or very close to it. This has as an advantage that the luminaires only need to send processed data to a central server, which means the data transmission requirements may be much lower. Furthermore, use of an embedded processor may have other advantages, such as an improved processing speed.

A drawback of the second method is that it is not feasible to have many processing units with sufficiently high processing capabilities, since these are simply too costly to be incorporated in many luminaires. Therefore, the requirements on hardware are much more stringent: to be able to give a certain level of accuracy with simpler processing, the sensed data should be much more precise. In the case of images, the images need to have a reasonable resolution, not too much lens distortion, and appropriate lighting conditions. Unfortunately, this increases in many applications the cost of the sensors to such an extent that not all luminaires may be equipped with one.

As a result of the above considerations, many systems rely on high accuracy (and hence: expensive) hardware implementation in combination with sparsely distributed sensors. This however is not ideal for many of the desired applications of dense luminaire networks, and therefore a cost-effective solution is needed. Furthermore, it is desirable to optimize the capabilities of luminaire networks including sensors in various ways.

In a second aspect, methods are known to extract traffic information from camera images. However, these may be insufficiently precise. Therefore, an improved method is desired.

SUMMARY

The object of embodiments of the first aspect of the invention is to take advantage of the possibilities offered by luminaire networks in which a plurality of the luminaires comprise a communication unit configured to enable communication of data to and from the communication units of other luminaires in said plurality of luminaires and/or to and from a central unit; a processing unit; a control unit configured to control the luminaire as well as the communication and processing units; and at least one first sensor, configured to output first sensed data.

This object may be achieved in a luminaire network wherein the processing unit of the luminaire is configured to process the first sensed data to produce first processed data; and wherein the luminaire network is further configured such that the first processed data of at least two luminaires is further processed to produce second processed data.

An inventive insight underlying the first aspect of the invention is that by combining data sensed by the respective first sensors of a plurality of luminaires, measurement resolution, accuracy, precision and error rates, hereafter collectively referred to as "data quality", may be improved, and that additionally combining data from a plurality of sensors may make it possible to determine results not achievable by measurements performed by a single luminaire. This is achieved by exploiting the fact that densely distributed sensors, for instance those associated with a luminaire network, tend to have expected correlation in the first processed data, for instance due to some kind of overlap in what they measure, and therefore the combination of data sensed by a plurality of densely distributed sensors may yield results with a high quality even if those sensors do not themselves produce data with a very high quality, e.g. because the sensor itself produces low quality images and/or because the processing unit of the luminaire has limited processing capacity. Preferably, the at least two luminaires are chosen such that their first processed data is expected to be correlated. This may be because the at least two luminaires are located relatively close to one another, and/or because the sensed area of their respective first sensors are at least in part overlapping. However, this need not be the case. For instance, if an aim of the luminaire network is to calculate traffic density (e.g. number of vehicles on a road at a given time), the first sensors of two luminaires positioned quite some distance apart along a same road may capture sensed data which may be advantageously combined. Furthermore, the absence of an expected correlation may also have informational value. For instance, in the case of sensors along a same road each measuring traffic information, if the first processed data of one luminaire indicates at least one vehicle going at a high speed, and if the first processed data of another luminaire further on along the side road indicates a traffic blockage, the combination and second processing of the first processed data from both luminaires may lead to the conclusion that there is a risk of a collision.

The phrases "of which the first processed data is expected to be correlated", "correlation between first processed data", "some overlap in what they measure" and "overlap of some kind in what they aim to sense" should therefore be interpreted broadly, to include any combination of sensors as described above. More generally, it should be interpreted to include any combination of sensors wherein the combination of (locally processed) sensed data can be advantageous due to the fact that there is potentially overlap in the information that is contained therein, and/or due to the fact that correlation of some degree is to be expected in the first processed data resulting from these sensors.

Examples would be correlation of determined traffic counting data between two luminaires that are a few kilometers away from each other along a highway; correlating of traffic counting data between luminaires located on each branch of a roundabout (as the number of incoming and outgoing vehicles should in theory add up), and even correlation between first processed data coming from different kinds of sensors, such as a correlation between data computed from a camera sensor and data computed from a weather conditions sensor being located in the same geographical area, and so on. The skilled person will be able to think of many more examples.

Note that a luminaire network may comprise several subsets of luminaires comprising first sensors, these subsets not necessarily being distinct or invariant and these sensors not needing to be identical or of the same type, wherein the first processed data from each luminaire of a subset of luminaires are advantageously combined to get a desired result. For instance, there may be a luminaire network in which each luminaire of a plurality of luminaires comprises at least a camera, wherein each luminaire of a subset of these luminaires has a processing unit configured to extract traffic data from the captured images and each luminaire of another (potentially smaller) subset of these luminaires has a processing unit configured to detect the presence of a ghost driver (i.e. a driver driving on the wrong side/direction of the road). The data of the luminaires from the first subset may be combined to yield traffic data as a result, while the data of the luminaires from the second subset may be combined to yield an alert if a ghost driver is detected. Which luminaire belongs to which subset may be chosen based on location, but also potentially on the quality of the first sensor, the processing capacity of the processing unit of the luminaire, a desire to minimize bandwidth, and/or many other factors. Note that while in general each luminaire will belong to a single subset, embodiments in which certain luminaires are part of several subsets are not excluded, and luminaires may also be reassigned from one subset to another over time.

In preferred embodiments, the luminaire network comprises at least three first sensors associated with at least three luminaires, and at least three sets of first processed data are used for determining the second processed data. More preferably, the luminaire network comprises at least five first sensors associated with at least five luminaires, and at least five sets of first processed data are used for determining the second processed data. Even more preferably, the luminaire network comprises at least ten first sensors associated with at least ten luminaires, and at least ten sets of first processed data are used for determining the second processed data. For some applications data from more than fifty or even more than hundred first sensors may be combined. By increasing the number of sets of first processed data, the accuracy of the second processed data can be further improved.

Preferably, the first processed data comprise a first value for a variable, and the second processed data comprise a second value for said variable, wherein the processing of the first processed data to obtain second processed data is performed such that the accuracy of the second value is higher than of that of the first value. The variable may be a traffic related variable such as a variable related to the number of vehicles passing during a certain period of time. For the example described above where it is desired to determine the presence of a ghost driver, the variable may be an binary variable indicating whether or not the first sensed data indicates the presence of a ghost driver. Typically, the accuracy of such a determination based on data from one first sensor will be low as other objects may move in the wrong direction. However, by combining multiple first values for the variable derived from image data from different first sensors, a second value for the variable can be obtained which is more accurate. In a further developed embodiment, the first processed data comprises a first value for a first variable and a first value for a second variable, and the second processed data comprise a second value for said first variable and second value for said second variable. For example, the first variable may be a number of vehicles of a first type (e.g. cars) passing during a certain period of time, and the second variable may be a number of vehicles of a second type (e.g. trucks) passing during a certain period of time. Especially for such type of variables which are more difficult to derive accurately from images, the fact of combining multiple sets of first processed data (i.e. multiple first values for one or more variables derived from image data from different first sensors) to obtain second processed data (i.e. a second value for one or more variables) may significantly improve the quality of the end result, and in particular the accuracy of the end result.

The variable may also be another environment related variable such as a weather related parameter, an air quality parameter, a vibration related parameter such as an earthquake related variable, a gunshot related variable, an emergency vehicle related variable, an accident related variable, a vehicle noise related parameter, etc. For example, the first sensors may be microphones, and the first processing may consist in comparing the sensed sound with pre-stored sound samples, in order to obtain a first value for a variable indicating whether or not a gunshot or an emergency vehicle has been detected. By combining multiple first values associated with different first sensors, in order to obtain a second value, a more accurate result can be obtained. In another example, the first sensor is a microphone or other sound sensor, and the processing unit is configured to generate an acoustic fingerprint based on a sound signal sensed by the first sensor and to analyze the acoustic fingerprint in order to determine the source of the sensed noise, e.g. a vehicle type of a vehicle passing the luminaire with the first sensor. The analyzing may be done e.g. by comparing an acoustic fingerprint with a sound sample stored in a database to determine a type of the sensed sound signal. For example, the database may comprise one or more sound samples associated with electric vehicle engines and one or more sound samples associated with fuel vehicle engines. This will allow determining whether a passing vehicle has a running fuel engine or a running electric engine. However, also other sound samples may be stored, such as sound samples of animal noises, sound samples of a collision between vehicles, sound samples of falling rain, sound samples of gunshot, etc. The processing unit may optionally be integrated in the microphone or other sound sensor. More generally the processing unit may be integrated with any type of first sensor. For this example, the first variable can be the type of the noise source. By combining multiple first values associated with different first sensors, in order to obtain a second value, a more accurate result can be obtained. For example, if multiple luminaires along a road determine that the first variable corresponds with a certain vehicle type, the quality of that determination is improved.

Notably, in all these examples and in many others, by performing a first pre-processing step locally, the required bandwidth is greatly reduced, as the first processed data will generally take up (much) less bandwidth than the unprocessed sensed data.

The communication unit may be a communication unit for wired communication using a protocol chosen from Ethernet, TCP/IP, Modbus, RS-485, DALI, interbus, fiber optics. The communication unit may rather (or additionally) be a communication unit for powerline communication based on one of PLC, HD-PLC, BPL. The communication unit may rather (or additionally) be a communication unit for wireless communication using a protocol chosen from among Bluetooth, WiFi, RFID, NFC, LoRA, Zigbee, Thread, Sigfox, GSM, GPRS, LTE, 2G, 3G 4G and 5G, Lifi, Wimax, etc. A combination of aforementioned protocols and/or communication units may also be used.

In an embodiment, the at least one first sensor comprises a camera. Cameras are a type of sensor wherein the quality of recorded images can vary quite a lot, wherein the average quality correlates strongly with cost, and wherein the volume of produced sensed data can be significant. Therefore, camera systems can benefit quite strongly from the underlying principles of the invention. Cameras may for instance be used to monitor parking and/or traffic in the neighborhood of luminaires.

The at least one first sensor may also, alternately or additionally, comprise other types of sensor, such as at least one of: a microphone or other sound sensor, a photosensitive sensor, an accelerometer, a wind sensor, a heat/thermal sensor, a thermometer, an RF sensor, an electromagnetic sensor, a smoke sensor, a dust sensor, an air quality sensor, a visibility sensor, a humidity sensor, an IR sensor, a motion sensor, an (ultra)sonic sensor, a microwave sensor, another type of environmental sensor, a radar or lidar based sensor.

There are several options regarding how the second processing step is performed.

In the first alternative, the luminaire network further comprises a central unit comprising a central processing unit and a central communication unit. The communication units of the plurality of luminaires are, in this alternative, configured to enable communication of data between the central unit and the respective luminaires, and the central processing unit is configured to perform at least part of the processing of the first processed data to produce second processed data.

In many embodiments, the central processing unit may be configured to have access to additional information to assist with the second processing. For instance, the central processing unit may be configured to have access to information about the location of the luminaires. The central unit may have access to location information of the luminaires in different ways. For instance, upon installation, the skilled person installing the luminaire could report the location information (for instance in the form of latitude/longitude information, but it could also be in the form of a street address) together with data to identify the luminaire to the central unit, and thus create a map. Luminaires may also be outfitted with GPS or other location sensors and report their location to the central unit, either once or several times. The skilled person will be aware of alternatives that allow the central unit to have access to information about the location of the luminaires. The central processing unit may also, additionally or alternatively, have access to information about which first processed data is expected to correlate, and in what way, with other first processed data. This information may be determined from historical measurements, but it may also be pre-determined and/or pre-defined.

Note that not every single luminaire communication unit needs to be in direct communication with the central unit—the first processed data may, for instance, be relayed from luminaire to luminaire until it reaches the communication unit of a luminaire which may communicate with the central unit. Also, the first processed data may be transmitted by the communication unit to a gateway and may be relayed by the gateway to the central unit. Furthermore, the "central" unit need not be centrally located: any server which is not part of a luminaire and which may analyze the first processed data of several luminaires may qualify. Thus, the processing by a "central unit" also covers processing "in the cloud". Moreover, the central unit may also be arranged in one of the luminaires.

In the second alternative, there is no need for such a central unit (though it may be present). Instead, at least a subset of the processing units of the luminaires is configured to perform at least part of the processing of the first processed data to produce second processed data through distributed computing. In distributed computing, a processing task is often not assigned to a specific, fixed processor but is instead assigned to at least one of several available processors—in this case the processing units of the luminaires—depending on available processing capability, location, and other factors which will be familiar to the skilled person. The skilled person understands that in such case the first processed data need to be transmitted by the communication unit, optionally via one or more other communication units to a processing location where the first processed data is needed. In particular, the assignment of processing to at least one processing unit of a luminaire through distributed computing may be chosen so as to reduce an amount of data transmission. This may entail analyzing first processed data of a first subset of luminaires located close to one another in a luminaire belonging to that subset, for instance. The assignment may be performed by a or some processing units of luminaires, by a processing unit of a central unit, and/or by another external processing unit. To be able to take location and proximity of the luminaire into account, the first processed data may for example further include data representative of a location of the associated luminaires. To assist in the performing of the second processing step, the local processing units may also have access to information about which first processed data is expected to correlate, and in what way, with other first processed data. This information may be determined from historical measurements, but it may also be pre-determined and/or pre-defined.

While these two embodiments are described above and in the figures as alternative options, this does not mean combinations are not possible. For instance, there may be systems in which the luminaires do not all aim at getting the same result R, even if their first sensors are the same or similar: a same luminaire network may be used to collect data both about parking and about traffic, for instance. In those cases, it may be advantageous to use a central unit for some of the second processing but to also do second processing by at least one processing unit of a luminaire.

Regardless of where the processing of the first processed data to produce the second processed data is performed, the processing units of the luminaires are preferably further configured to take into account an indication of quality of the first sensed data and/or the first processed data to produce the second processed data (R). More in particular, at least one static or dynamic quality parameter representative for the quality of the first sensed data and/or the first processed data may be taken into account. In a further developed embodiment, an indication of estimated quality of the first sensed data and/or of the first processed data may be included in the first processed data, and this estimated quality is taken into account to produce the second processed data. This may further improve the accuracy of the resulting second processed data.

The quality may be influenced by static parameters and by dynamic parameters. The quality parameters may relate to the sensing itself or to the processing of the sensed data to produce the first processed data. There are various ways to estimate the quality of the first sensed data and/or of the first processed data. The following examples may be used by themselves or in any combination.

Firstly, the indication of estimated quality of the first sensed data and/or of the first processed data may be based at least in part on the first sensed data. Taking the example in which the at least one first sensor comprises a camera, the indication of estimated quality of the first sensed data may be based at least in part on at least one of a dynamic range of an image, an exposure time of a camera, a white balance, an ISO-value, a noise level, and other indicators of image quality. For instance, a high dynamic range tends to be indicative of a high quality image, and thus hopefully high quality data, whereas a low dynamic range may indicate a lower quality image and hence lower quality data. A long exposure time may mean an image is likely to be overexposed and/or blurred, and is thus often indicative of lower quality, etc. Therefore, for example when using a camera as a first sensor, there are ways of estimating the quality—of the image and of the resulting first processed data.

This is not only true if the used first sensor is a camera. The dynamic range, for instance, can be indicative of the quality of sensed data for a wide range of sensors, microphones and sound sensors among them. For microphones and other sound sensors, the level of ambient noise may be indicative of quality. Skilled persons will be aware of many ways to estimate the quality of data (and of any resulting analysis) based on the sensed data.

The indication of quality or estimated quality may also be based on characteristics of the first sensors which sensed the first sensed data, such as a time since a last calibration of the first sensors. The time since a last calibration may be especially relevant for sensors which tend to experience "sensor drift" and which need to be calibrated at regular intervals to remain accurate. Other characteristics of the sensors may also be relevant. For instance, if the sensor is a camera, the quality of the lens may influence the quality of the data. Analogous considerations apply for other types of sensors.

The indication of the quality or estimated quality of the first sensed data and/or of the first processed data may be based at least in part on the other data, e.g. other measured or received or calculated data. For example, the quality may be estimated based on the time of the day, the weather conditions, the date, etc. This data may be measured or determined locally or may be received from a remote device. For example, if the first sensor is a camera, and the sensed images may be used to classify the vehicles identified in the images (e.g. cars versus trucks) based on the size of a vehicle in the image. However, depending on the position of the sun, the shadow of the vehicle can adversely affect the results. This may be corrected by taking into account e.g. the sun level (which may be determined based on the GPS position and the time of the day, e.g. measured by an astronomical clock). Also the shadow of large obstructions within the environment of the luminaire (e.g. a building, a mountain, a tree, etc.) may affect the quality of the sensed data, and this may be taken into account when estimating the quality. It is noted that in the example provided above, the sun level may be used to determine a quality indication (e.g. better quality when the shadows are smaller) and/or may be used when processing the first sensed data to produce more accurate first processed data.

A plurality of luminaires may, additionally or alternately, comprise at least one secondary sensor configured to output second sensed data, wherein the indication of the estimated quality of the first sensed data and/or of the first processed data is based at least in part on the second sensed data. These secondary sensors may be comprised in the same luminaires which comprise a first sensor, but this is not essential, as long as the secondary sensor is located such that the secondary sensor may be used to estimate the quality of the first sensed data and/or of the first processed data from at least one luminaire. This secondary sensor may for instance be an accelerometer, a vibration sensor, a wind sensor, a thermometer, a heat/thermal sensor, a humidity sensor, an environmental sensor, a microphone or other sound sensor, an air quality sensor, a smoke sensor, a dust sensor, a photosensitive sensor, a visibility sensor, a radar- or lidar-based sensor, an infrared sensor, a camera, a light sensor, an astronomical clock, an RF sensor, a motion sensor, an (ultra)sonic sensor, a microwave sensor, or a combination thereof. An accelerometer may for instance be useful to assess the quality of sensed data of a camera: if the luminaire is moving a lot (due to wind or other causes), the image quality is likely to be poorer than if the luminaire is stationary. A wind sensor will work in similar circumstances, and may additionally also help estimate the quality of data sensed by a microphone or other sound sensor: if there is a lot of wind, the quality of sound recordings is likely to be poorer than in the absence of wind. Other factors in the environment, such as the temperature, the humidity, the air quality etc. may also affect the quality of sensed data from different kinds of first sensors.

Note that in particular in the case of many types of environmental sensors, but potentially also for other secondary sensors, a single secondary sensor may be used to assess the quality of sensed data and/or of the first processed data from a plurality of first sensors associated with a plurality of luminaires. If it is misty, for instance, this is not likely to be very localized.

Note furthermore that the secondary sensor data may be used both to estimate the quality of the first sensed data and/or of the first processed data and also to be used as first sensor data in all the ways described in the present application. For instance, the measurements from an accelerometer may be used to estimate the quality of an image recorded by the first sensor of the associated luminaire, and additionally the measurements of accelerometers of a plurality of luminaires could be processed locally to produce first processed data relating to accelerometer information, which may then be combined with first processed data relating to accelerometer information of other luminaires to, for instance, produce second processed data relating to seismographic incidents. Many other such examples will be clear to the skilled person.

Additionally, combining second sensed data may lead to an improved estimation of quality for first processed data. Indeed, in situations where the first sensed data is combined with second sensed data to produce the first processed data, the quality of the first processed data may be higher than the quality of the first sensed data. For example, as explained above, the level of the sun may be used during processing to "improve" the first sensed data, such that first processed data with an increased quality is obtained.

More generally, during the processing of the first sensed data, additional received, stored, sensed or calculated data may be used to produce the first processed data. For example, weather or environment related data may be used to avoid erroneous derivations from the first sensed data.

There are many ways of combining the first processed data of a plurality of luminaires. For instance, a potentially simple way of performing the processing of the first processed data to produce second processed data may comprise averaging the first processed data. The respective indications of quality or estimated quality of the first sensed data or of the first processed data may be used to determine averaging weights. Thus, first processed data which is estimated to be of high quality will be more important in producing the second processed data than first processed data which is estimated to be of low quality. In processing the first processed data to produce second processed data, it may also be useful to disregard first processed data that is found to be an outlier with respect to the first processed data of a plurality of luminaires of which the first processed data is expected to be correlated, as outliers are likely to be a result of a measurement error of the associated sensor and/or a processing error in producing the first processed data and/or of errors introduced into the first processed data during transmission. Therefore, taking these outliers into account may introduce undesirable loss of quality into the second processed data. However, there may also be cases wherein an outlier may indicate an exceptional situation which needs to be addressed. Preferably, the second processing step is configured such that this may be accounted for. The skilled person will be aware of best practices in the field of data analysis to be able to yield an optimal quality of the resulting second processed data.

Note that it may have advantages to include in the luminaire network at least one storage unit which may store at least some historical data, for instance pertaining to earlier processing results. This storage unit may be a shared storage unit, but there may also be storage units comprised in at least one luminaire. For instance, if a first sensor produces outlying data a number of times, it may be useful to attach less weight to its first processed data when producing the second processed data. Furthermore, there may even be embodiments in which an alert is produced if a first sensor is suspected of being defective based on the data it produces, such that it may be checked on location and repaired or replaced if needed. Other actions may also be taken as a response. For instance, the second processing algorithm may be adapted to take into account the deviating results, and/or the first processing routine may be adapted, for instance through communication to the relevant luminaire.

In embodiments, the communication unit of the luminaires may be configured to receive the second processed data, e.g. from the central unit or from another luminaire, and the control unit may be configured to control the lighting apparatus and/or the processing unit based on the second processed data.

In one possible embodiment of the invention, the at least one first sensor comprises an electromagnetic sensor, and the second processed data comprises information about the presence, estimated position and preferably identifying information of an entity emitting electromagnetic radiation such as an unmanned aerial vehicle (UAV). The electromagnetic sensor may for instance be an RFID sensor, which can read information from RFID tags present in a UAV, but it may also, additionally or alternatively, include any sensor which is sensitive to electromagnetic signals emitted by the UAV, preferably electromagnetic signals which comprise some type of identifying information. Such a sensor would sense many electromagnetic signals, most of them likely not to be from UAVs. In the first processing step, a first selection may then be made to filter these signals, and/or an estimation of distance could be made based on signal strength. As an example, signals from sources consistently present in the environment of the sensors may be discarded.

In the second processing step, the first processed data could then be used to determine which signals may originate from a UAV, to estimate (for instance through triangulation) the position of this UAV, and potentially to identify it. The movement of the UAV may also be followed in this manner. This method may be in particular advantageous to detect unlicensed UAVs, since it does not require either communication with the UAV or modification/configuration of the UAV. Note that while the foregoing relates to UAVs, the skilled person will be able to apply the same or similar principles to detect, follow and/or identify other entities which emit electromagnetic information. For instance, the detection or tracking of mobile phones may be used to track persons. In another example, an increasing proportion of cars are now equipped with V2X systems, and therefore systems as described above could also be used to monitor not just traffic generally, but also at least the presence, position, motion and/or identity of individual vehicles.

The invention further related to a method of processing sensor data in a luminaire network, comprising the following steps: sensing data at a plurality of luminaires to produce first sensed data; processing the first sensed data to produce first processed data; and combining the first processed data to produce second processed data. The method may include a step of collecting the first processed data prior to the step of combining the first processed data to produce the second processing step.

Preferably, this method further comprises producing respective representative indications of the quality of the first sensed data and/or of the first processed data; and use the indications of the quality of the first sensed data and/or of the first processed data in the step of combining the first processed data to produce the second processed data. The method may include a step of collecting the indications of the quality of the first sensed data and/or of the first processed data with the first processed data prior to the second processing step. More in particular, at least one static or dynamic quality parameter representative for the quality of the first sensed data and/or the first processed data may be taken into account. In a further developed embodiment, an indication of estimated quality of the first sensed data and/or of the first processed data may be included in the first processed data, and this estimated quality is taken into account to produce the second processed data. This may further improve the accuracy of the resulting second processed data. The producing of the respective representative indications of the quality of the first sensed data and/or of the first processed data may be based on at least one of the first sensed data, preferably, if the sensed data comprises image data, at least one of a dynamic range of an image, an exposure time of a camera, a white balance, an ISO-value, a noise level, and other indicators of image quality; characteristics of the first sensors which sensed the first sensed data; characteristics of the processing unit to produce the first processed data; second sensed data; and a time since a last calibration of the first sensor.

The method may further comprise controlling at least one lighting apparatus and/or the processing unit based on the second processed data.

In a second aspect, this application relates to a method of determining traffic information about a roadway with a plurality of lanes. This method may be applied in conjunction with the first aspect, but it is not limited to this. In particular, though the method according to the second aspect as described is advantageously used in a luminaire network, it is not limited to use in a luminaire network.

The method according to this second aspect comprises the following steps:
a) capturing sensor data relating to the plurality of lanes of the roadway;
b) determining traffic information relating to each of the plurality of lanes from the sensor data;
c) comparing the determined traffic information relating to each of the plurality of lanes to pre-determined values which depend on the respective lane of the plurality of lanes;
d) determining traffic information about the roadway based on the results of the comparison.

This method may be more precise than existing method, which often rely on average speed. This is at least in part due to the fact that certain traffic behavior may be representative of traffic issues in one lane, while it is perfectly normal in another lane. In general, in Europe, an innermost traffic lane is expected to have a higher average speed, for instance, than an outermost traffic lane. Special lanes such as off-ramps and on-ramps or even shoulders will tend to have other typical behavior.

In many embodiments the sensor data comprises image data captured by at least one camera. However other sensors are not excluded, either additionally or alternatively. In particular, considering the increasing use of V2X technology in cars, future applications of the claimed method may be based on electromagnetic radiation and/or communication with cars.

The traffic information relating to each of the plurality of lanes may comprises information about an average speed of vehicles traveling in the respective lanes. Methods to determine this average speed will be known to the skilled person. In that case, step c) may comprise comparing the average speed in each lane to a first threshold for that lane, wherein at least two of the first thresholds are different. For instance, this comparison may classify the average speed in each lane as either "fast" or "slow". As an example, consider a roadway with a maximum speed of 120 km/h, three lanes and an off-ramp. In the innermost/fastest lane (which in continental Europe will be the leftmost lane and in the British Isles will be the rightmost lane), the threshold may be set at 110 km/h. In the next lane, the threshold could be set, for instance, at 90 km/h. In the further next lane after, the threshold could be set at 80 km/hour. For the off-ramp, which we will here assume to be a relatively short off-ramp leading to a roadway with a lower maximum speed, we may set the threshold around 40 km/h, since much lower speeds are to be expected here, and need not indicate any adverse traffic conditions. Note that in some cases, in particular with a high number of lanes, some of the thresholds could be the same, but at least two will have different values.

For more precision, step c) may further comprise comparing the average speed in each lane to a second threshold for that lane, wherein at least two of the second thresholds are different, and wherein each second threshold is lower than the respective first threshold for that lane. In the example described above, for instance, a further differentiation could be made for the "slow" lanes, to determine whether traffic in these lines has moderate speed or is really stationary or close to it. The second threshold could for instance be set at 60 km/h for the innermost/fastest lane, at 50 km/h for the next one, at 45 km/h for the third lane and at 20 km/h for the off-ramp.

The resulting determined traffic information about the roadway may then comprise information about how the average speed in each lane compares to the at least one threshold for that lane. The determined traffic information about the roadway may then for instance comprise information about whether traffic in each lane is to be considered fast, moderate or slow/stationary. This may later be translated to a visual indication, as will be explained in more detail in relation to FIGS. 8 and 9.

Alternately or additionally, the traffic information relating to each of the plurality of lanes may comprise information about a number of vehicles traveling in the respective lanes.

In particular, if the sensor data comprises image data sensed during a pre-determined period of time, the traffic information relating to each of the plurality of lanes may comprise information about a number of vehicles traveling in the respective lanes during the pre-determined period of time, sometimes also referred to as the traffic flow. Step c) may then comprise comparing the number of vehicles traveling in each lane during the pre-determined period of time to a first threshold for that lane, wherein at least two of the first thresholds are different. Preferably, step c) further comprises comparing the number of vehicles traveling in each lane during the pre-determined period of time to a second threshold for that lane, wherein at least two of the second thresholds are different, and wherein each second threshold is lower than the respective first threshold for that lane. In this case, the traffic information relates to how busy certain lanes are, which is related to congestion. In particular, the determined traffic information about the roadway may comprises information about how the number of vehicles traveling in each lane during the pre-determined period of time compares to the at least one threshold for that lane.

The traffic information is not limited to the examples above. For instance, aside from or in addition to the information about the average speed in each lane and/or the number of vehicles traveling in each lane during a pre-determined period of time, the average acceleration and/or minimum and/or maximum speeds and/or accelerations may prove informative. The skilled person will be able to determine which type or types of traffic information would be most useful in a particular application or situation.

This information may be used, either by itself or in conjunction to information relating to the average speed in each lane, to signal and/or anticipate traffic issues. The lane-dependent thresholds, for average speed in that lane and/or the number of vehicles traveling in that lane during the pre-determined period of time, may be based on expected values for the respective lane, wherein these expected values are provided as input and/or determined from historical data.

The sensed data may comprise image data sensed by a plurality of cameras. This may for instance be useful in case there are many lanes, or in case the determination of the average speed and/or the traffic flow in a certain lane is performed by sensing data at a plurality of locations.

The method may further comprise, if the determined traffic information indicates a risky situation, generating an alert. This alert can take many forms. It may be an alert to the authorities and/or to at least one person operating a vehicle on the roadway. The latter may make use of display means visible to this person, may be communicated to the vehicle itself, and/or may make use of any other means.

Advantageously, and in accordance with the first aspect of the invention, the invention relates to a method of determining traffic information about a roadway with a plurality of lanes which comprises performing the method as described above at a first location along the roadway to determine first traffic information; performing the method as described above at a second location along the roadway to determine second traffic information; and determining traffic information about the roadway by combining the first traffic information and the second traffic information. In this method as well, if the determined traffic information indicates a risky situation, an alert may be generated, for instance in ways described elsewhere in the application.

The method according to the second aspect, whether based on traffic information determined at one location or traffic information determined by combining traffic information from a plurality of locations, may comprise visually displaying the determined traffic information.

The method according to the second aspect, whether based on traffic information determined at one location or traffic information determined by combining traffic information from a plurality of locations, may comprise storing historical data relating to previously determined traffic information; and predicting expected future traffic information from the determined traffic information using the historical data relating to previously determined traffic information. Note that these predictions may be improved due to the lane-specific traffic information. In particular, shifts of traffic from certain lanes to others may be indicative of imminent issues.

The method according to the second aspect may further comprise displaying indications relating to the predicted expected future traffic information, preferably such that the indications are visible to at least one person operating a vehicle on one of the lanes of the roadway. For instance, operators of vehicles in certain lanes may be instructed to adapt their speed, or be warned of possible upcoming issues. The displaying may be done using known displays over the roadway, but communication to individual vehicles and/or individual people is not excluded.

In preferable embodiments, the method is at least partially performed by elements of a luminaire network, for instance in a luminaire network according to the first aspect of the invention.

The second aspect also relates to a luminaire network comprising a plurality of luminaires along a roadway with a plurality of lanes, comprising at least one sensor, configured to capture sensor data relating to the plurality of lanes of the roadway and at least one processing unit, configured to perform at least steps b), c) and d) of the method according to the second aspect as described above, to determine traffic information about the roadway.

The at least one sensor comprises at least one camera. Additionally or alternatively, it may comprise at least one storage unit. The storage unit may be configured to store the pre-determined values which depend on the respective lane of the plurality of lanes; such as first thresholds and preferably second thresholds. The storage unit may be configured to store previously registered sensor data. The storage unit may be configured to store at least some previously determined traffic information.

The luminaire network may further comprise at least one communication unit configured to send the determined traffic information to a server or other external device. The communication unit may for instance be used to instruct a display to display certain determined traffic information, or to communicate with vehicles configured for V2X communication.

The luminaire network as described above may further comprise at least one display, preferably a display visible to at least one person operating a vehicle on one of the lanes of the roadway.

Embodiments of the invention relate in particular to outdoor luminaire networks. By outdoor luminaires, it is meant luminaires which are installed on roads, tunnels, industrial plants, campuses, parks, cycle paths, pedestrian paths or in pedestrian zones, for example, and which can be used notably for the lighting of an outdoor area, such as roads and residential areas in the public domain, private parking areas and access roads to private building infrastructures, etc.

The second aspect may be defined according to any one of the following clauses:

1. Method of determining traffic information (Tr) about a roadway with a plurality of lanes (L1, L2, L3, L4); the method comprising:
   a) capturing sensor data (Sr) relating to the plurality of lanes of the roadway;
   b) determining traffic information (T1, T2, T3, T4) relating to each of the plurality of lanes (L1, L2, L3, L4) from the sensor data (Sr);
   c) comparing the determined traffic information (T1, T2, T3, T4) relating to each of the plurality of lanes (L1, L2, L3, L4) to pre-determined values which depend on the respective lane of the plurality of lanes (L1, L2, L3, L4);
   d) determining traffic information (Tr) about the roadway based on the results of the comparison.
2. Method according to clause 1, wherein the sensor data comprises image data captured by at least one camera.
3. Method according to clause 1 or 2, wherein the traffic information (T1, T2, T3, T4) relating to each of the plurality of lanes (L1, L2, L3, L4) comprises information about an average speed of vehicles traveling in the respective lanes.
4. Method according to clause 3, wherein step c) comprises comparing the average speed in each lane (L1, L2, L3, L4) to a first threshold (D1-1, D1-2, D1-3, D1-4) for that lane, wherein at least two of the first thresholds (D1-1, D1-2, D1-3, D1-4) are different.
5. Method according to clause 4, wherein step c) further comprises comparing the average speed in each lane (L1, L2, L3) to a second threshold (D2-1, D2-2, D2-3, D2-4) for that lane, wherein at least two of the second thresholds (D2-1, D2-2, D2-3, D2-4) are different, and wherein each second threshold (D2-1, D2-2, D2-3, D2-4) is lower than the respective first threshold (D1-1, D1-2, D1-3, D1-4) for that lane.
6. Method according to clause 4 or 5, wherein the determined traffic information about the roadway (Tr) comprises information about how the average speed in each lane (L1, L2, L3, L4) compares to the at least one threshold for that lane.
7. Method according to clause 6, wherein the determined traffic information about the roadway (Tr) comprises information about whether traffic in each lane (L1, L2, L3, L4) is to be considered fast, moderate or slow/stationary.
8. Method according to any of the previous clauses, wherein the traffic information (T1, T2, T3, T4) relating to each of the plurality of lanes (L1, L2, L3, L4) comprises information about a number of vehicles traveling in the respective lanes.
9. Method according to clause 8, wherein the sensor data comprises image data sensed during a pre-determined period of time, and wherein the traffic information (T1, T2, T3, T4) relating to each of the plurality of lanes (L1, L2, L3, L4) comprises information about a number of vehicles traveling in the respective lanes during the pre-determined period of time.
10. Method according to clause 9, wherein step c) comprises comparing the number of vehicles traveling in each lane (L1, L2, L3, L4) during the pre-determined period of time to a first threshold (D1-1, D1-2, D1-3, D1-4) for that lane, wherein at least two of the first thresholds (D1-1, D1-2, D1-3, D1-4) are different.
11. Method according to clause 10, wherein step c) further comprises comparing the number of vehicles traveling in each lane (L1, L2, L3, L4) during the pre-determined period of time to a second threshold (D2-1, D2-2, D2-3, D2-4) for that lane, wherein at least two of the second thresholds (D2-1, D2-2, D2-3, D2-4) are different, and wherein each second (D2-1, D2-2, D2-3, D2-4) is lower than the respective first threshold (D1-1, D1-2, D1-3, D1-4) for that lane.
12. Method according to clause 10 or 11, wherein the determined traffic information about the roadway (Tr) comprises information about the number of vehicles traveling in each lane (L1, L2, L3, L4) during the pre-determined period of time compares to the at least one threshold for that lane.
13. Method according to any of clauses 4 or 10, optionally in combination with any one of the other clauses, wherein the lane-dependent thresholds are based on expected values for the respective lane, wherein these expected values are provided as input and/or determined from historical data.
14. Method according to any of the previous clauses, wherein the sensed data comprises image data sensed by a plurality of cameras.
15. Method according to any of the previous clauses, further comprising:
    e) if the determined traffic information (Tr) indicates a risky situation, generating an alert.
16. Method of determining traffic information (Tr-1) about a roadway with a plurality of lanes (L1, L2, L3, L4); the method comprising:
    1) performing the method of any of the previous clauses at a first location along the roadway to determine first traffic information (Tr-1);
    2) performing the method of any of the previous clauses at a second location along the roadway to determine second traffic information (Tr-2);
    3) determining traffic information (Tr) about the roadway by combining the first traffic information (Tr-1) and the second traffic information (Tr-2).
17. Method according to clause 16, further comprising:
    4) if the determined traffic information (Tr) indicates a risky situation, generating an alert.
18. Method according to any of the previous clauses, further comprising visually displaying the determined traffic information (Tr).
19. Method according to any of the previous clauses, further comprising
    storing historical data relating to previously determined traffic information (Tr-p); and
    predicting expected future traffic information (Tr-f) from the determined traffic information (Tr) using the historical data relating to previously determined traffic information (Tr-p).
20. Method according to clause 19, further comprising:
    displaying indications relating the predicted expected future traffic information (Tr-f), preferably such that the indications are visible to at least one person operating a vehicle on one of the lanes (L1, L2, L3, L4) of the roadway.
20. Method according to clause 19, further comprising:
    transmitting indications relating the predicted expected future traffic information (Tr-f) to a remote device.
22. Method according to any of the previous clauses, wherein the method is preferably at least partially performed by elements of a luminaire network.
23. Luminaire network comprising a plurality of luminaires along a roadway with a plurality of lanes (L1, L2, L3, L4), comprising
    at least one sensor, configured to capture sensor data (Sr) relating to the plurality of lanes of the roadway and
    at least one processing unit, configured to perform at least steps b), c) and d) of the method according to at least one of the previous clauses, to determine traffic information (Tr) about the roadway.
24. Luminaire network according to clause 23, wherein the at least one sensor comprises at least one camera.
25. Luminaire network according to clause 23 or 24, comprising at least one storage unit configured to store the pre-determined values which depend on the respective lane of the plurality of lanes (L1, L2, L3, L4); such as first thresholds (D1-1, D2-1, D3-1) and preferably second thresholds (D1-2, D2-2, D3-2); and/or configured to store previously registered sensor data; and/or configured to store at least some previously determined traffic information (Tr).
26. Luminaire network according to any of clauses 22-24, further comprising at least one communication unit configured to send the determined traffic information (Tr) to a server or other external device.
27. Luminaire network according to any of clauses 22-25, further comprising at least one display, preferably a display visible to visible to at least one person operating a vehicle on one of the lanes (L1, L2, L3, L4) of the roadway.

BRIEF DESCRIPTION OF THE FIGURES

The invention will be further elucidated at the hand of the attached figures, wherein.

DETAILED DESCRIPTION OF THE FIGURES

In the figures, like reference numbers refer to like elements.

Figure 1:
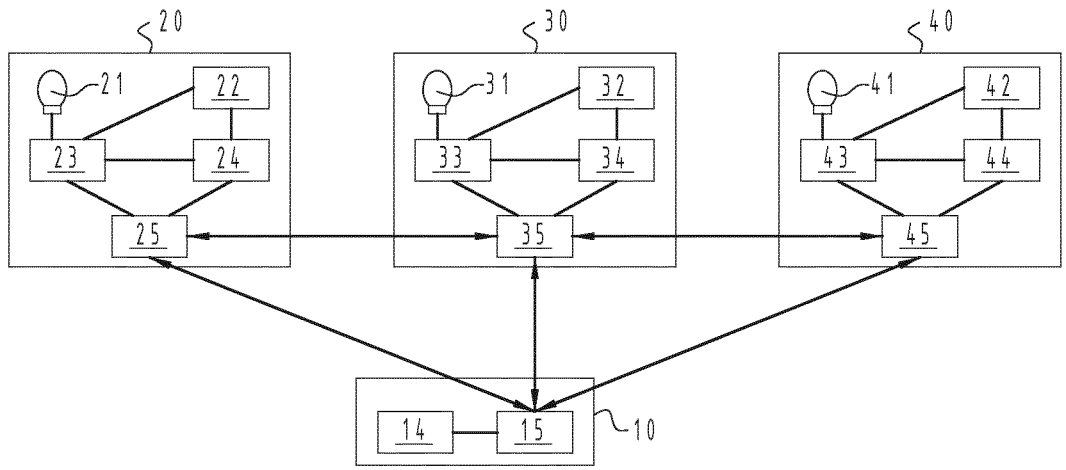
FIG. 1 is a block diagram of an embodiment of the luminaire network which includes a central unit.

FIG. 1 shows a block diagram of an embodiment of the luminaire network according to the invention which includes a central unit. While only 3 luminaires 20, 30, 40 are shown, it will be clear that luminaire networks may comprise many more luminaires.

Each luminaire comprises a lighting apparatus 21, 31, 41, which is controlled by control unit 23, 33, 43. Each of the shown luminaire further comprises at least one first sensor 22, 32, 42. Note that not all luminaires need to comprise a sensor: some luminaires may be placed in locations where little useful sensor input is to be expected. Furthermore, not all luminaires need to comprise the same sensor or sensors. Non-limitative examples of sensors which may be used in the invention are: a camera, a microphone or other sound sensor, a photosensitive sensor, an accelerometer, a wind sensor, a thermometer, a heat/thermal sensor, an RF sensor, an electromagnetic sensor, a smoke sensor, a dust sensor, an air quality sensor, another type of environmental sensor, a radar or lidar based sensor, a visibility sensor, a humidity sensor, an IR sensor, a motion sensor, an (ultra)sonic sensor, a microwave sensor, etc.

The plurality of luminaires 20, 30, 40 further comprise a processing unit 24, 34, 44, which may receive first sensed data $S_1$, $S_2$, $S_3$ from the at least one first sensor 22, 32, 43 and be controlled by control unit 23, 33, 43. The control unit further controls the communication unit 25, 35, 45, which may receive first processed data $P_1$, $P_2$, $P_3$ from the processing unit 24, 34, 44 to send it to the communication unit 15 of central unit 10. Note that the communication unit 25, 35, 45 may also allow the luminaire to communicate with other luminaires in the luminaire network. Furthermore, while in the figure direct lines are drawn from communication units 25, 35, 45 and central communication unit 15, this does not imply that there needs to be direct communication between each communication unit 25, 35, 45, as data may be relayed by other luminaires as well. The skilled person will be able to determine the most efficient and cost-effective way to enable communication with the central communication unit 15.

The central communication unit 15 relays the received data $P_1$, $P_2$, $P_3$ to central processing unit 14, which uses the first processed data $P_1$, $P_2$, $P_3$ from the plurality of luminaires 20, 30, 40 to produce second processed data R. The luminaires are preferably chosen such that there is some overlap between what at least some of the luminaires aim to sense, and/or such that the respective first processed data ($P_1$, $P_2$, $P_3$) is expected to be correlated. Therefore using sensed data $S_1$, $S_2$, $S_3$ of such luminaires, in particular by combining the first processed data $P_1$, $P_2$, $P_3$ may improve data quality. Furthermore, because it is first processed data $P_1$, $P_2$, $P_3$ which is sent to the central unit, and not the raw sensed data $S_1$, $S_2$, $S_3$, the requirements on bandwidth are lessened.

Advantageously, the central unit may further comprise a storage unit. This storage unit may, amongst other things, store information which is useful in the processing of first processed data $P_1$, $P_2$, $P_3$ to produce second processed data R. For instance, the storage unit may store at least one of an ID number of the first sensor; a configuration of and/or an algorithm running in the first sensor electronics itself and/or in the processing unit; a firmware version running on the first sensor; if the first sensor is a camera, what type of lens it has; GPS coordinates; historical data; information about expected correlations, and so on.

Figure 2:
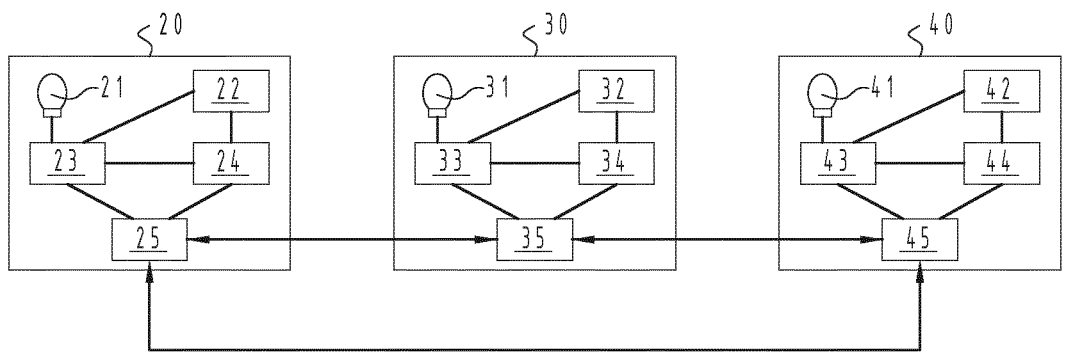
FIG. 2 is a block diagram of an embodiment of the luminaire network in which distributing processing is used.

FIG. 2 shows an alternate embodiment in which no central unit is present. Note that the presence and use of a central unit is not excluded in this embodiment, as a combination of central and distributed processing is also a possibility, and as the central unit may be useful to provide and keep track of certain data even if processing is done in a distributed manner. Like references refer to like elements: the shown luminaires 20, 30, 40 comprise a lighting apparatus 21, 31, 41; a control unit 23, 33, 43; a processing unit 24, 34, 44 and a communication unit 25, 35, 45. Though not shown, some or all of the luminaires may also comprise a storage unit, which may store information necessary for the performing of the first and/or second processing step. The communication unit 25, 35, 45 enables the luminaires 20, 30, 40 to communicate and to share the first processed data $P_1$, $P_2$, $P_3$ produced by the processing units 24, 34, 44. While the figure depicts lines between all the communication units 25, 35, 45, there does not need to be direct communication between each and every communication unit of the luminaire network: data may also be relayed. The processing of the collected first processed data $P_1$, $P_2$, $P_3$ to produce second processed data (R) may take place at any of the processing units 24, 34, 44 or be distributed among several of these processing units. The skilled person will be aware of how to coordinate such distributed processing. The choice of processing unit or units may be optimized for any of several factors, for instance to minimize bandwidth use, maximize speed, and/or improve accuracy.

Figure 3:
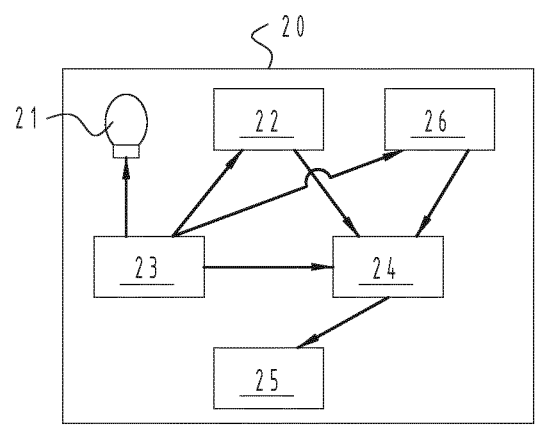
FIG. 3 is a block diagram of a luminaire of a luminaire network wherein secondary sensors are used.

FIG. 3 shows a luminaire 20 belonging to an embodiment of a luminaire network according to the invention wherein a secondary sensor 26 is present. Note that a plurality of the luminaires or even all of the luminaires comprising a first sensor may but does not have to comprise such a secondary sensor 26. Note also that not every luminaire comprising a secondary sensors needs to comprise a first sensor as well. The second sensed data $C_1$ sensed by this secondary sensor 26 may be used to estimate the quality of the sensed data $S_1$ and/or of the first processed data $P_1$. Note that the quality that is estimated is not just a quality of the image, but also an estimation of the quality of information derived from the sensed data by the processing unit 24, 34, 44. Furthermore, second sensed data $C_1$, $C_2$, $C_3$ may in its turn be processed into additional first processed data and then (collected and) combined into additional second processed data, if desired.

Note that while the luminaires are depicted similarly, there may be various differences. For instance, there may be differences in: the type of first sensor(s), the type of secondary sensor(s), the type of processing unit, the type of configuration of the processing unit, the type of control unit, the type of configuration of the control unit, the type of communication unit, the connections of the communication unit, the type of lighting apparatus, etc.

Furthermore, in some embodiments there may be several results R produced from different (but potentially overlapping) sets of first processed data $P_1$, $P_2$, $P_3$. For instance, a result $R_1$ could be produced from first processed data $P_1$, $P_2$ and $P_3$, while another result $R_2$ could be produced from first processed data $P_1$, $P_4$, $P_5$ and $P_6$. Furthermore, in some embodiments it may be possible to change the configuration of processing units to thus change the resulting processed data $P_1$, $P_2$, $P_3$, such that the resulting results R are improved.

As an example, an embodiment may comprise camera based sensors located in luminaires along a highway segment. Each may individually be configured to compute the average speed per lane along this highway segment. If the result of the second processing (R) shows that the average speed is very low, this will likely mean that there is a traffic jam. The system may be configured such that, when conditions like these are encountered, the system is configured to (temporarily) change the processing mode ($P_1$, $P_2$, $P_3$) of relevant luminaires such that the first processing and second processing yield results relevant for 'traffic queuing detection' instead of calculating the average speed.

In another example with luminaires positioned along a highway segment, each of the processing units of a plurality of luminaires may be configured such that the first processed data $P_1$, $P_2$, $P_3$, originating from a first processing step processing sensed data captured by the first sensors of respective first, second and third luminaires, relate to traffic data. For instance, the processing may include a per-lane analysis as described elsewhere in the application. $P_1$, $P_2$, and $P_3$ may for instance comprise information about the number of passing vehicles, about the average speed, about the average speed per lane, about the speed of the fastest registered vehicle and/or about the presence of unusual features. During the second processing step, it may be noted that $P_1$ and $P_2$ indicate fluid traffic and/or at least one fast-moving vehicle, the first processed data $P_3$, which originates from a luminaire positioned further along the highway, indicates a stoppage or traffic jam, or perhaps a traffic accident. This may indicate that there is a risk of a collision, if the fast-moving vehicles registered by the first sensors of the first and second luminaires are suddenly confronted with the slow-moving or stopped vehicles registered by the first sensor of the third luminaire. Therefore, the result of the second processing, R, may comprise information about this risk.

Any of a number of actions may be taken as a result. For instance, any of a number of warning actions could be taken: at least one luminaire (which may include luminaires along the stretch of highway between the second and third luminaires, even if they are not equipped with sensors and/or processing units) may be instructed to alter its light to some type of warning light or warning light pattern; a display along or above the highway may be used to warn the drivers of vehicles, and in the case of vehicles equipped with V2X systems, a warning could even be displayed in the vehicle itself. In the latter case, it may even be possible to send control signals to specific vehicles such that they automatically slow down. A possible action is also to change the processing setting of the processing unit of the third luminaire such that it is aimed at collision detections specifically.

The above is merely one example showing that combination of first processed data from a plurality of luminaires may be used not just to improve the quality of the results, but also to make it possible to get additional data, for instance by comparing first processed data from a plurality of luminaires. The skilled person will be able apply the principles of this example to other situations.

Figure 4:
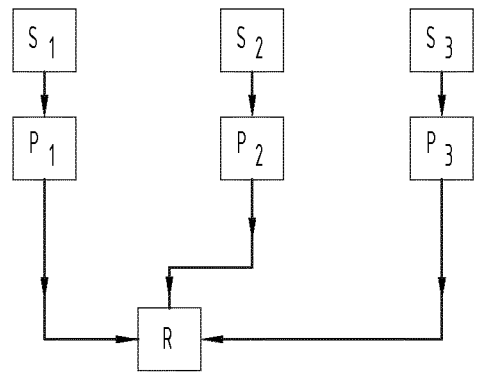
FIG. 4 is a block diagram showing the various data streams in an embodiment of the luminaire network.

FIG. 4 shows the data streams in more detail, for a simple embodiment. First sensed data $S_1$, $S_2$, $S_2$ are processed to produce respective first processed data $P_1$, $P_2$, $P_3$. Note that this first processing step is performed entirely locally and does not require the use of the communication unit 25, 35, 45 at all. Then, the locally produced first processed information $P_1$, $P_2$, $P_3$ is collected and combined, either centrally and/or through distributed processing, to produce second processed data R.

Figure 5:
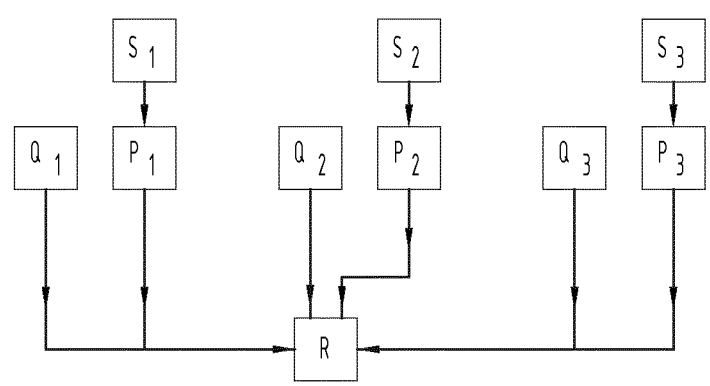
FIG. 5 is a block diagram showing the various data streams in another embodiment of the luminaire network.

FIG. 5 shows a somewhat more complex embodiment, in which respective indications $Q_1$, $Q_2$, $Q_3$ of estimated quality of this first sensed data $S_1$, $S_2$, $S_3$ and/or of the first processed data $P_1$, $P_2$, $P_3$ are also collected, and are combined with first processed data $P_1$, $P_2$, $P_3$ to produce second processed data R.

Figure 6:
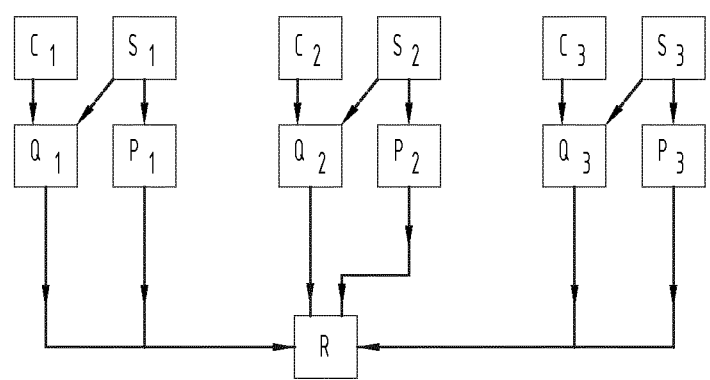
FIG. 6 is a block diagram showing the various data streams in yet another embodiment of the luminaire network.

FIG. 6 shows yet another embodiment, which gives more detail about how the respective indications $Q_1$, $Q_2$, $Q_3$ of estimated quality of this first sensed data $S_1$, $S_2$, $S_3$ and/or of the first processed data $P_1$, $P_2$, $P_3$ may be established. In particular, the respective indications $Q_1$, $Q_2$, $Q_3$ of estimated quality of the first sensed data $S_1$, $S_2$, $S_3$ and/or of the first processed data $P_1$, $P_2$, $P_3$ may be based on the first sensed data $S_1$, $S_2$, $S_3$ itself, and/or on characteristics of the first sensor which sensed the first sensed data, and/or on characteristics of the processing unit, and/or on any other dynamic of static parameter influencing the quality. It may also, additionally or alternately, be based on second sensed data $C_1$, $C_2$, $C_3$ from a secondary sensor.

Not shown in this figure is that the second sensed data $C_1$, $C_2$, $C_3$ from the secondary sensors may itself, after a first local processing step, be collected and combined into additional second processed data $R_2$, but it is noted that this is not in any way excluded. Furthermore, there is no requirement for every indication $Q_1$, $Q_2$, $Q_3$ of estimated quality to be based on different second sensed data $C_1$, $C_2$, $C_3$: in some cases, second sensed data $C_1$ from a single secondary sensor may be used to estimate the quality of sensed data $S_1$, $S_2$, $S_3$ and/or of the first processed data $P_1$, $P_2$, $P_3$ from a plurality of first sensors.

The skilled person will be able to envisage many alterations, combinations, permutations and elaborations on the systems described above. An inventive idea underlying the first aspect of invention is that a luminaire network is generally a dense network, and that sensors comprised in luminaires may therefore produce sensed data with a relatively high degree of overlap in what they sense and/or wherein some degree of correlation is to be expected. It is further based on the realization that luminaires may be equipped with the ability to communicate amongst themselves and/or with a central unit and with some processing capabilities, and that therefore a combination of local and distributed processing may be used to minimize requirements on sensors, processors and bandwidth simultaneously. Finally, the combination of data from different luminaires may be able to lead to additional insights. The second aspect of the invention, which may require only a single sensor, relates to improvements of specifically traffic measurement.

The invention is not limited to a certain type or number of sensors, nor is it limited to the embodiments described above.

Figure 7:
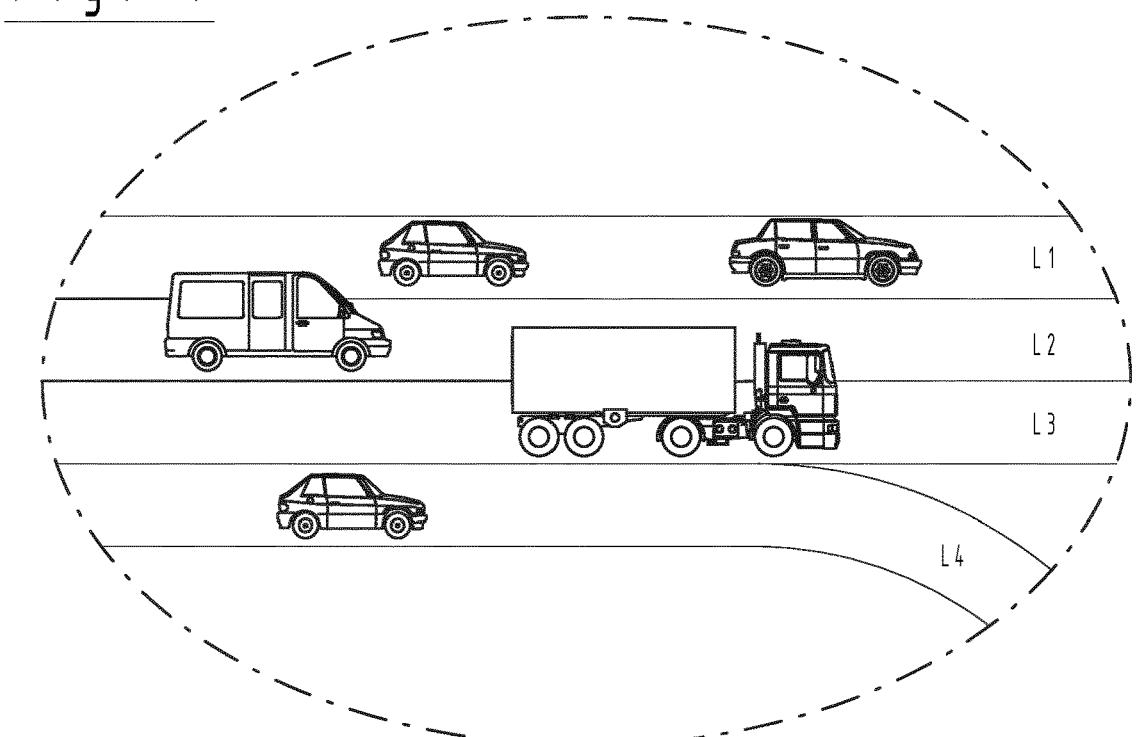
FIG. 7 is an illustration of possible image data captured by a camera located at the side of a roadway with a plurality of lanes which may be used in the method according to the second aspect.

FIG. 7 illustrates in an abstract, simplified way what a camera located along a roadway with a plurality of lanes ($L_1$, $L_2$, $L_3$, $L_4$) may observe. An average speed may be different for each lane: generally, the average speed is expected to be highest in the innermost lane $L_1$, lower in the next lane $L_2$, and lower still in the third lane $L_3$. Lane $L_4$ is an off-ramp, and the expected average speed of vehicles in this lane will depend on the length and angle of the off-ramp as well as the type of roadway it may lead to. Many types of traffic information may be determined from such image information, and in particular from a plurality of successively captured images. Examples are an average speed, an average number of vehicles passing through during a predetermined period of time, maximum and minimum speeds, accelerations, etc. In the method according to the second aspect of the invention, traffic information $T_1$, $T_2$, $T_3$, $T_4$ is determined for each lane $L_1$, $L_2$, $L_3$, $L_4$ separately. Furthermore, to ascertain the traffic situation, the information is compared to pre-determined, lane-dependent values. These values may comprise a single value per lane, but may also comprise a plurality of lane-dependent values. The comparison results then yield traffic information $T_r$ about the roadway. While FIG. 7 shows an abstraction of possible image data, the method is not limited to image data.

Figure 8:
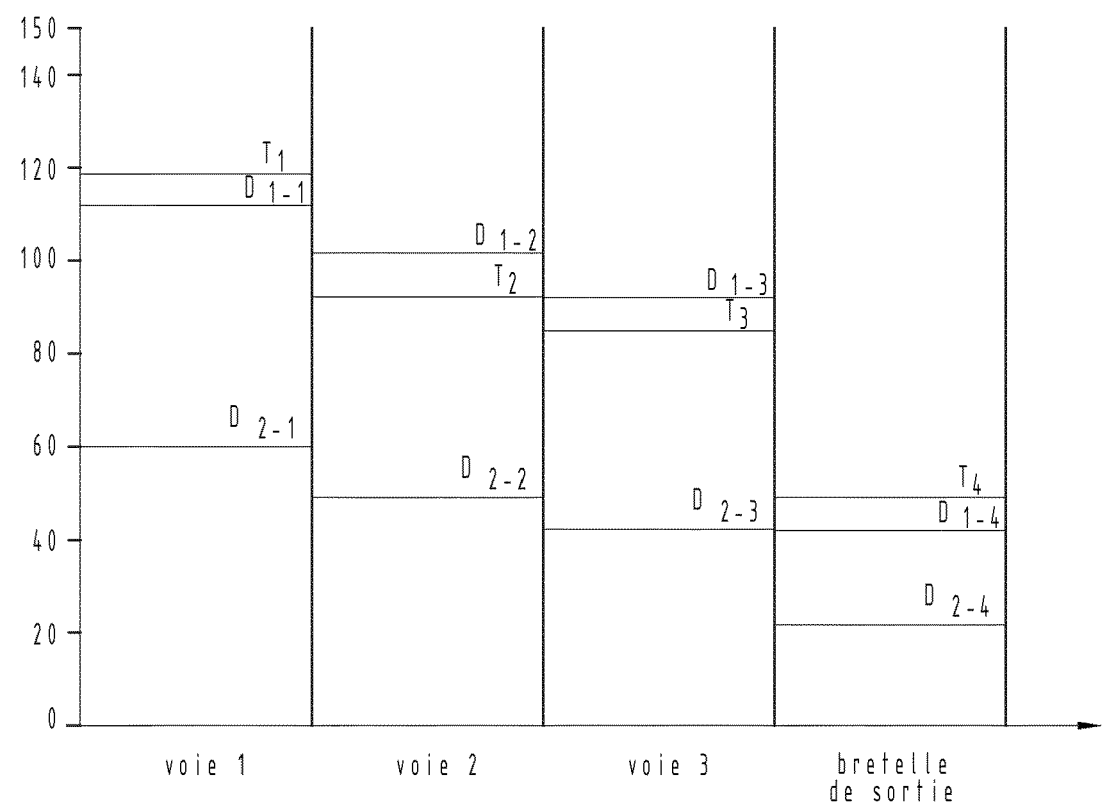
FIG. 8 illustrates a method according to the second aspect, and a possibility for visual display.

FIG. 8 illustrates the method further at the hand of an example. Lines $T_1$, $T_2$, $T_3$, $T_4$ indicate determined traffic information, in this particular example an average speed. The considered roadway may be the one as seen in FIG. 7, with four lanes. The maximum speed in this example is 120 km/h. The average speed $T_1$ in lane 1 is only slightly less than that maximum. The average speed $T_2$ in lane 2 is around 90 km/h. The average speed $T_3$ in lane three is around 80 km/h. The average speed $T_4$ in lane 4, the off-ramp, is only about 50 km/h.

A method considering only the overall average speed may conclude that traffic is slow in this particular stretch of roadway, since the vehicles on the off-ramp have a lowering effect. The method according to the second aspect, however, is more precise. In particular, in the example of FIG. 8, each lane has two thresholds. First thresholds $D_{1-1}$, $D_{1-2}$, $D_{1-3}$, $D_{1-4}$ are chosen such that if the average speed in a lane is above it, traffic in that lane can be said to be fluid or fast; and that if the average speed in the lane is below it, traffic in that lane can be said to be moderate or slow, or even stationary. For each lane, this threshold is different: if the average speed in lane 1 is 90 km/h, this is not fast, whereas if the average speed in lane 4 is 90 km/h, that would be extraordinarily fast. Second thresholds $D_{2-1}$, $D_{2-2}$, $D_{2-3}$, $D_{2-4}$ introduce a further demarcation: if the average speed in a given lane is between the first and second threshold, traffic in that lane can be said to be moderate, whereas if the average speed in a lane is below the second threshold, traffic is slow or even stationary. The second thresholds are also different. An average speed of 50 km/h is perfectly normal on the off-ramp, whereas it signals serious traffic issues in lane 4.

In the present example, the average speed in lane 1, $T_1$, is above the first threshold $D_{1-1}$: traffic in that lane is fluid or fast. In lanes 2 and 3, $T_2$ lies between $D_{1-2}$ and $D_{2-2}$ and $T_3$ lies between $D_{1-3}$ and $D_{2-3}$: traffic in those lanes is going at a moderate speed. The average speed in lane 4, $T_4$, lies above $D_{1-4}$, indicating smooth traffic there.

Note that FIG. 8 may also be seen as an example of how to visualize the results of the method according to the second aspect. Presented with such an image, a person can easily and quickly assess the traffic situation. Further note that while FIG. 8 has speed on the y-axis, many other types of traffic information may be used, with appropriate thresholds; furthermore, several types of traffic information may be combined for more nuanced results.

Figure 9:
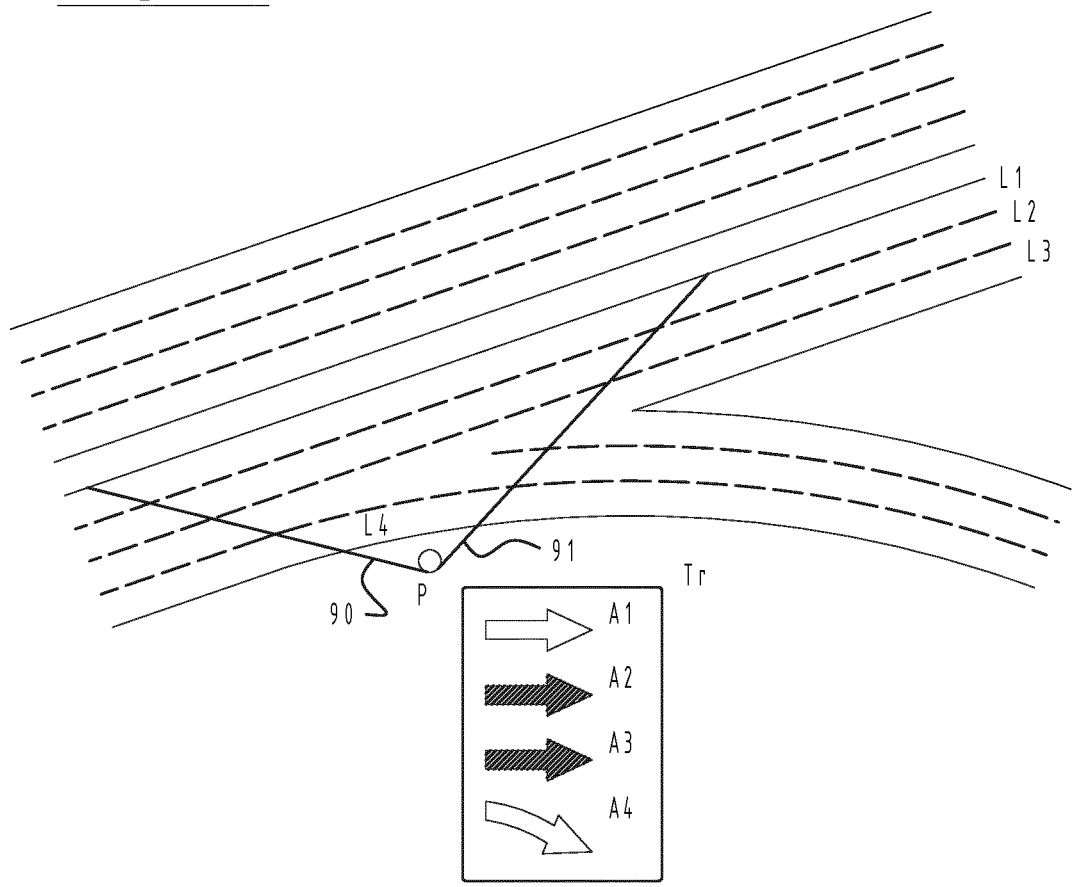
FIG. 9 illustrates a map of a roadway to which the method according to the second method is applicable, as well as an example of visually displaying the results of a method according to the second aspect.

FIG. 9 shows a map of a road with two roadways, each with four lanes. A sensor P may be placed and configured such that it can capture data, for instance image data, relating to the plurality of lanes $L_1$, $L_2$, $L_3$, $L_4$ of one roadway. For information purposes, a map may be displayed with an indication of the position of sensor P and lines 91 and 92 indicating the field of view. Furthermore, FIG. 9 shows another, simpler way of displaying traffic information to a user. The box $T_r$ comprises one arrow for each lane, using often-use symbols: here, straight arrows $A_1$, $A_2$ and $A_3$ for the through-lanes $L_1$, $L_2$, $L_3$ and bent arrow $A_4$ for the off-ramp $L_4$. These arrows may then be color-coded to display the result of the comparison between the determined traffic information for each lane and the associated pre-determined comparison values. For instance, referring back to the example described in conjunction with FIG. 8, $A_1$ and $A_4$ may be green to indicate fluid traffic conditions, while $A_2$ and $A_3$ may be yellow or orange, for example, to indicate that the average speed is moderate there when compared to expected values. Red could be used to indicate very slow or stationary traffic in a lane. As will be clear, a map of a larger area, displaying such compact visual indications at several points, will allow for a very quick yet precise assessment of the general traffic conditions, which improves on existing methods which merely indicate where the general average speed is moderate or low.

As will be clear, FIG. 7-9 illustrate only an example of the method according to the second aspect, and many variations will be clear to the skilled person which make use of a lane-dependent evaluation of lane-specific traffic information. Furthermore, while the first and second aspects of the invention have separate advantages, advantageous embodiments may combine these aspects to further improve results.

In embodiments of the invention according to the first aspect, the first sensor may be e.g. a camera. The images captured by the camera may be used e.g. to determine the type of the vehicles that drive on the road adjacent a luminaire, or to count the vehicles driving on the road. For example, three first sensors of three adjacent luminaires may determine the following first processed data:

|  | first processed data | |
|---|---|---|
| Luminaire | % of cars | % of trucks or busses |
| First sensor of luminaire 1 | 75 | 25 |
| First sensor of luminaire 2 | 55 | 45 |
| First sensor of luminaire 3 | 50 | 50 |

The second processed data may consist in an average value of the percentage of sensed cars and the percentage of sensed trucks or busses, resulting in the example above in 60% of cars and 40% of trucks or busses.

In addition or alternatively, three first sensors of three adjacent luminaires may determine the following first processed data:

| | first processed data | | |
|---|---|---|---|
| Luminaire | % for which the number of counted vehicles per time frame is within 0-50 | % for which the number of counted vehicles per time frame is within 51-100 | % for which the number of counted vehicles per time frame is within 101-150 |
| First sensor of luminaire 1 | 10 | 80 | 10 |
| First sensor of luminaire 2 | 12 | 78 | 10 |
| First sensor of luminaire 3 | 10 | 74 | 16 |

The second processed data may consist in an average value of the percentage of counted vehicles per time frame being within a predetermined range, resulting in the example above in:

during 11% of the time the number of vehicles per time frame is between 0 and 50;
during 77% of the time the number of vehicles per time frame is between 51 and 100;
during 12% of the time the number of vehicles per time frame is between 101 and 150.

The table below illustrates a couple of exemplary embodiments of the first aspect.

| First sensor | First sensed data | Goal | First processed data | Second processed data |
|---|---|---|---|---|
| Camera | Images | Alert to police or operator | Unusual Direction/ghost driver detection | Analysis of how many first sensors are sending the wrong direction information, combined with GPS data to conclude if it really is a wrong direction |
| Camera | Images | Classification (cars or trucks) | Classification of vehicles based on sensed data of a camera | Classification of vehicles based on the classification data from a plurality of first sensors, i.e. a plurality of camera's |
| Camera | Images | Speed Bin counts | Number of counts in each speed bin | Combination of all speed bins from relevant first sensors to better estimate speed bins |
| Vibration sensor/accelerometer sensor | Vibrations | Alert for Earthquake | Unusual vibrations | Analysis of how many first sensors and where unusual vibrations are detected |

In the first example the first sensor is a camera, and it is desired to alert the police or an operator when an unusual direction of a vehicle/a ghost driver is detected. Typically, camera sensors on their own can only be relied upon to determine that something unusual has happened in terms of tracking a vehicle. However, by combining the measurements of several camera sensors, an alert of wrong direction can be sent to the police or to an operator in a reliable manner. The determining of the second processed data based on the first processed data from several luminaires can be done in a luminaire device or in a remote device (e.g. the central unit).

In the second example the first sensor is a camera, and it is desired to count the number of cars and the number of trucks that drive in the road. The first sensor of a luminaire is a camera sensing images, and based on those images, the number of light vehicles and the number of heavy vehicles that pass within a predetermined time period is determined; this is the first processed data.

Typically such first processed data will have an accuracy X which fulfills 0<X<Max, wherein Max may be e.g. the maximum accuracy possible for the first sensor/processing unit. By combining classification information of a plurality of first sensors of adjacent luminaires, it is possible to achieve an increased level of accuracy e.g. by averaging the values of heavy and light vehicles derived from the first sensed data of the plurality of first sensors, as explained above. In that way the accuracy X of the classification determined as the second processed data may approach the value Max at all times of the day.

In the third example the first sensor is a camera, and it is desired to count the number of vehicles that drive in the road. The quality of the second processed data will be improved and the counts in the speed bins will be more accurate by combining the speed bin information of different first sensors.

In the fourth example the first sensor is a vibration sensor or accelerometer sensor, and it is desired to detect earthquakes. Also for this example, the use of multiple first sensors in different luminaires will significantly improve the accuracy of the second processed data and/or allows identifying the epicenter of the earthquake.

In yet other examples, the first processed data may comprise a variable indicating the detection of emergency vehicle or of a gunshot or of any other sound, such as a vehicle sound or an animal sound, as has been explained in more detail in the summary.

To further improve the accuracy of the second processed data, an indication of the quality of the first processed data may be taken into account. The table below lists a series of static and dynamic quality parameters may be taken into account. One or more of those parameters may be taken into account to obtain an indication of the quality of the first sensed data and/or of the first processed data.

| DYNAMIC QUALITY PARAMETERS | STATIC QUALITY PARAMETRS |
|---|---|
| Signal to Noise ratio[1]: | Algorithm running on camera |
| Frame rate | City Version |
| Exposure time | Highway Version |
| Gain | Two way street |
| Temperature | One way street |
| Light level in scene | Pedestrian Detection |
| Vibration data | Parking |
| Hardware limits | Firmware version |
| Processing load | Lens installed |
| Available Memory | Viewing angle |
| Dynamic Range of Current Scene | Distortion |
| Above Specs[2] | Third party correlation: |
| Below Specs | Constructions |
| Obstructions yes/no: | Obstructions |
| Bright light | Traffic Info |
| Sunlight | |
| Complete black or low light | GPS location |
| Fog | Sunrise and Sunset times |
| Insects Spiders etc. | |

[1]Signal to noise Ratio or SNR varies with the exposure time, temperature and the gain applied to the sensor
[2]This is a flag to say if the Dynamic range of the current scene is or is not within the limits of the Dynamic Range specification of the image sensor The dynamic parameters may be estimated e.g. using a secondary sensor as has been described in more detail above. The static parameters may be stored in a database e.g. on the central unit. Alternatively, the static parameters may be stored in a luminaire and may be transmitted to the location where the second processed data is produced, e.g. the central unit. Based on one or more quality parameters related to a first sensor and/or on one or more quality parameters related to the processing unit producing the first processed data, more or less weight may be given to the corresponding first processed data when performing the further processing to produce the second processed data. In that manner, the reliability of the second processed data can be further increased.

Whilst the principles of the invention have been set out above in connection with specific embodiments, it is to be understood that this description is merely made by way of example and not as a limitation of the scope of protection which is determined by the appended claims.

The invention claimed is:

1. A luminaire network, comprising a plurality of luminaires comprising a lighting apparatus, wherein each of at least two luminaires of the plurality of the luminaires comprises:
   a communication unit configured to enable communication of data to and from communication units of other luminaires in the plurality of luminaires or to a central unit;
   a processing unit;
   a control unit configured to control the lighting apparatus as well as the communication and processing units; and
   at least one first sensor, configured to output first sensed data,
   wherein the processing unit is configured to process the first sensed data to produce first processed data,
   wherein the luminaire network is further configured such that the first processed data of said at least two luminaires is further processed to produce second processed data, and
   wherein an indication of quality of at least one of the first sensed data and the first processed data is taken into account to produce the second processed data.

2. The luminaire network according to claim 1, wherein the first processed data comprise a first value for a variable, wherein the second processed data comprise a second value for the variable, and wherein the processing of the first processed data to obtain second processed data is performed such that the accuracy of the second value is higher than of that of the first value.

3. The luminaire network according to claim 1, wherein the processing units of the luminaires are further configured to determine an indication of estimated quality of the first sensed data or the first processed data, and wherein this estimated quality is taken into account to produce the second processed data.

4. The luminaire network according to claim 3, wherein the indication of quality or estimated quality of the first sensed data or the first processed data is based at least in part on:
   the first sensed data;
   at least one of: a dynamic range of a captured image, an exposure time of a camera, a white balance, an ISO-value, a noise level, a signal-to-noise ratio, a processing load, available memory, obstruction data, vibration data, weather data, light data, sunlight data, or another indicator of image quality; or
   characteristics of the respective first sensor.

5. The luminaire network according to claim 3, wherein, in the processing of the first processed data to produce second processed data, the indications of quality or estimated quality of the first sensed or the first processed data are used to determine averaging weights.

6. The luminaire network according to claim 1, wherein the at least one first sensor comprises a camera.

7. The luminaire network according to claim 1, wherein the at least one first sensor comprises at least one of: a microphone or other sound sensor, a photosensitive sensor, an accelerometer, a vibration sensor, a wind sensor, a thermometer, a heat or thermal sensor, an RF sensor, an electromagnetic sensor, a smoke sensor, a dust sensor, an air quality sensor, another type of environmental sensor, a radar or lidar based sensor, a visibility sensor, a humidity sensor, an IR sensor, a motion sensor, an sonic or ultrasonic sensor, a microwave sensor, an IR sensor, a light sensor, and an astronomical clock.

8. The luminaire network according to claim 1, further comprising the central unit comprising a central processing unit and a central communication unit, wherein the communication units of the plurality of luminaires are further configured to enable communication of data between the central communication unit and the respective luminaires, and wherein the central processing unit is configured to perform at least part of the processing of the first processed data to produce second processed data.

9. The luminaire network according to claim 8, wherein the central processing unit is configured to have access to information about the location of the luminaires or to information about expected correlations between the first processed data of the plurality of luminaires.

10. The luminaire network according to claim 1, wherein at least a subset of the processing units of the luminaires are configured to perform at least part of the processing of the first processed data to produce second processed data through distributed computing.

11. The luminaire network according to claim 10, wherein the network is configured such that the assignment of processing to at least one processing unit of a luminaire through distributed computing reduces an amount of data transmission.

12. The luminaire network according to claim 1, further configured such that the first processed data includes data representative of a location of the associated luminaire.

13. The luminaire network according to claim 1, wherein the plurality of luminaires comprises at least one secondary sensor configured to output second sensed data.

14. The luminaire network according to claim 13, wherein the indication of the quality or the estimated quality of the first sensed data or the first processed data is based at least in part on the second sensed data.

15. The luminaire network according to claim 13,
wherein the processing unit is configured to process the first sensed data to produce first processed data using the second sensed data, or
wherein the at least one secondary sensor comprises an accelerometer, a vibration sensor, a wind sensor, a thermometer, a heat or thermal sensor, a humidity sensor, an environmental sensor, a microphone or other sound sensor, an air quality sensor, a smoke sensor, a dust sensor, an RF sensor, a photosensitive sensor, a visibility sensor, a camera, an IR sensor, a light sensor, an astronomical clock, a radar-based sensor, a lidar-based sensor, a motion sensor, a sonic sensor, an ultrasonic sensor, or a microwave sensor.

16. The luminaire network according to claim 1, wherein the processing of the first processed data and the indication of a quality or an estimated quality of the first sensed data or the first processed data to produce second processed data comprises averaging the first processed data.

17. The luminaire network according to claim 1,
wherein first processed data that is found to be an outlier with respect to the first processed data of a plurality of luminaires of which the first processed data is expected to be correlated is disregarded in producing the second processed data, or
wherein (i) the communication unit of the luminaires is configured to receive the second processed data and (ii) the control unit is configured to control the lighting apparatus or the processing unit based on the second processed data, or
wherein (i) the at least one first sensor comprises an electromagnetic sensor and (ii) the second processed data comprises information about the presence, estimated position, and identifying information of an entity emitting electromagnetic radiation.

18. A method of processing sensor data in a luminaire network comprising a plurality of luminaires, comprising:
sensing data at each of at least two luminaires of said plurality of luminaires to produce first sensed data for each of said at least two luminaires;
processing each first sensed data to produce first processed data for each of said at least two luminaires; and
combining the first processed data from said at least two luminaires to produce second processed data,
wherein an indication of quality of at least one of the first sensed data and the first processed data is taken into account to produce the second processed data.

19. A luminaire network comprising a plurality of luminaires comprising a lighting apparatus, wherein each of at least two luminaires of the plurality of the luminaires comprises:
a communication unit configured to enable communication of data to and from communication units of other luminaires of the plurality of luminaires or to a central unit;
a processing unit;
a control unit configured to control the lighting apparatus as well as the communication and processing units;
at least one first sensor, configured to output first sensed data; and
at least one secondary sensor configured to output second sensed data, wherein the processing unit is configured to process the first sensed data to produce first processed data using the second sensed data.

20. The luminaire network according to claim 19,
wherein the at least one first sensor comprises a camera, and
wherein the at least one secondary sensor comprises an accelerometer, a vibration sensor, a wind sensor, a thermometer, a heat or thermal sensor, a humidity sensor, an environmental sensor, a microphone or other sound sensor, an air quality sensor, a smoke sensor, a dust sensor, an RF sensor, a photosensitive sensor, a visibility sensor, a camera, an IR sensor, a light sensor, an astronomical clock, a radar-based sensor, a lidar-based sensor, a motion sensor, a sonic sensor, an ultrasonic sensor, or a microwave sensor.

* * * * *